US005913370A

United States Patent [19]

Chapelle et al.

[11] Patent Number: 5,913,370

[45] Date of Patent: Jun. 22, 1999

[54] PNEUMATIC OR PRESSURIZED FLUID TOOL HAVING A CONTROL DEVICE

[75] Inventors: Jean-Louis Chapelle, Neuvecelle; Didier Barbier, Thonon, both of France

[73] Assignee: Etablissements Charles Maire, Evian les Bains, France

[21] Appl. No.: 08/969,020

[22] Filed: Nov. 12, 1997

[30] Foreign Application Priority Data

Nov. 19, 1996 [FR] France .................................. 96 14089

[51] Int. Cl.[6] ...................................................... B23B 45/04

[52] U.S. Cl. .......................... 173/169; 173/170; 173/218

[58] Field of Search .................................... 173/169, 168, 173/93.5, 93.6, 93, 176, 218, 170

[56] References Cited

U.S. PATENT DOCUMENTS

| | | | |
|---|---|---|---|
| 3,181,672 | 5/1965 | Swanson | 173/93 |
| 3,352,323 | 11/1967 | Wickham | 173/169 |
| 3,402,778 | 9/1968 | Carter | 173/169 |
| 3,556,230 | 1/1971 | Roggenburk | 173/93.5 |
| 4,088,197 | 5/1978 | Roll et al. | 173/12 |
| 4,708,210 | 11/1987 | Rahm | 173/169 |
| 4,822,264 | 4/1989 | Kettner | 418/150 |
| 5,083,619 | 1/1992 | Giardino | 173/93.5 |
| 5,199,460 | 4/1993 | Geiger | 137/625.43 |
| 5,377,769 | 1/1995 | Hasuo | 173/169 |
| 5,531,279 | 7/1996 | Biek | 173/178 |

FOREIGN PATENT DOCUMENTS

| | | |
|---|---|---|
| 0566227 | 10/1993 | European Pat. Off. . |
| 3503032 | 7/1986 | Germany . |
| 3522596 | 1/1987 | Germany . |
| 2106024 | 4/1983 | United Kingdom . |
| 2157213 | 10/1985 | United Kingdom . |

*Primary Examiner*—Scott A. Smith
*Assistant Examiner*—James P. Calve
*Attorney, Agent, or Firm*—Greenblum & Bernstein P.L.C.

[57] ABSTRACT

Pneumatic or pressurized fluid tool, such as a screwdriver, having a control device. The control device includes a pivotally mounted trigger which causes rotation of the motor in a first rotational direction when pivoted in a first direction and which causes rotation of the motor in an opposite rotational direction when pivoted in a second direction opposite to the first direction. The trigger is connected to a piston which is movable in a cylinder. The piston is connected by a rod to a valve and includes a cam. The cam of the piston, cooperating with a plunger, operates a selector so that when the trigger is pivoted in the first direction, compressed air or pressurized fluid is admitted to rotate the motor in the first direction. If the trigger is pivoted in the second direction, the cam, cooperating with the plunger, moves the selector to close an inlet passage corresponding to the first rotational direction of the motor and opens a second inlet passage corresponding to the opposite rotational direction of the motor.

8 Claims, 5 Drawing Sheets

PNEUMATIC OR PRESSURIZED FLUID TOOL HAVING A CONTROL DEVICE

BACKGROUND OF THE INVENTION

1. Field of the Invention

The present invention concerns a control device for pneumatic tools such as screwdrivers.

2. Description of the Prior Art

Pneumatic tools, and screwdrivers in particular, generally comprise a body housing a pneumatic motor connected by a kinematic coupling to a drive member, the body including a handle connected to a source of fluid under pressure and including a trigger for controlling the entry of the fluid under pressure, e.g., compressed air, to drive the motor.

In many cases, and in screwdrivers in particular, it is necessary to be able to run the motor not only in the normal direction but also in the opposite direction.

In one prior art control device the trigger pivots about an intermediate point and is mounted so that when it is pulled near one end entry of compressed air is commanded in the normal direction of rotation of the motor whereas, if it is pulled near the other end, rotation of the motor in the reverse direction is commanded.

An implementation of the above kind is very practical because the worker can command screwing in or unscrewing simply by moving his finger on the trigger.

A design of this kind is complex and costly.

One aim of the present invention is to remedy these drawbacks.

SUMMARY OF THE INVENTION

A control device in accordance with the invention for pneumatic tools such as screwdrivers includes a body housing a pneumatic motor driving a tool via kinematic coupling. The body is fastened to a handle including an inlet passage adapted to be connected to a compressed air supply hose and an exhaust passage connected directly to the exhaust of the motor. A trigger is pivoted to the handle at a point partway along its length and connected by a kinematic coupling to a valve to command, when pivoted in one direction or the other. Entry of compressed air into a cavity opening toward a first inlet passage corresponds to a normal direction of rotation of the motor when the trigger is pivoted in one direction and toward a second inlet passage corresponding to an opposite direction of rotation of the motor when the trigger is pivoted in the opposite direction. Means selectively convey compressed air to one or the other of the inlet passages according to the direction in which the trigger is pivoted.

In the control device the trigger is connected to a piston mobile in a cylinder. A rod is fastened to the valve being inserted in an opening of the piston so that, when the trigger is pivoted in one direction or the other, the result is entry of compressed air. The piston has on a side opposite the trigger a cam cooperating with one end of a plunger guided in a bore of the body. The other end of the plunger bears against a selector one end of which pivots on a pin on a wall of the body, which wall includes an exhaust passage. The other end of the selector terminates in a vane cooperating with the wall. Spring means maintain the selector in a position in which the first inlet passage can be supplied with compressed air, such that the trigger establishes communication between the second inlet passage and the exhaust passage. Pivoting of the trigger in the direction corresponding to normal rotation of the motor causes the piston to slide in one direction to command opening of the valve. Pivoting of the trigger in the opposite direction causes the piston to slide in the opposite direction to cause opening of the valve and causing the cam to displace the plunger which, cooperating with the selector, moves the selector so that the vane shuts off the first inlet passage, opens the second inlet passage and establishes communication between the first inlet passage and the exhaust passage.

This yields a control device of simple design that is reliable in operation.

In accordance with one constructional detail, the end of the plunger cooperating with the cam comprises a ball bearing.

Accordingly, actuating the trigger in the direction corresponding to the opposite direction of rotation of the motor is gentle and progressive for the user.

The invention will now be described in more detail with reference to one particular embodiment shown by way of example only in the accompanying drawings.

DETAILED DESCRIPTION OF THE PREFERRED EMBODIMENTS

Figure 1:
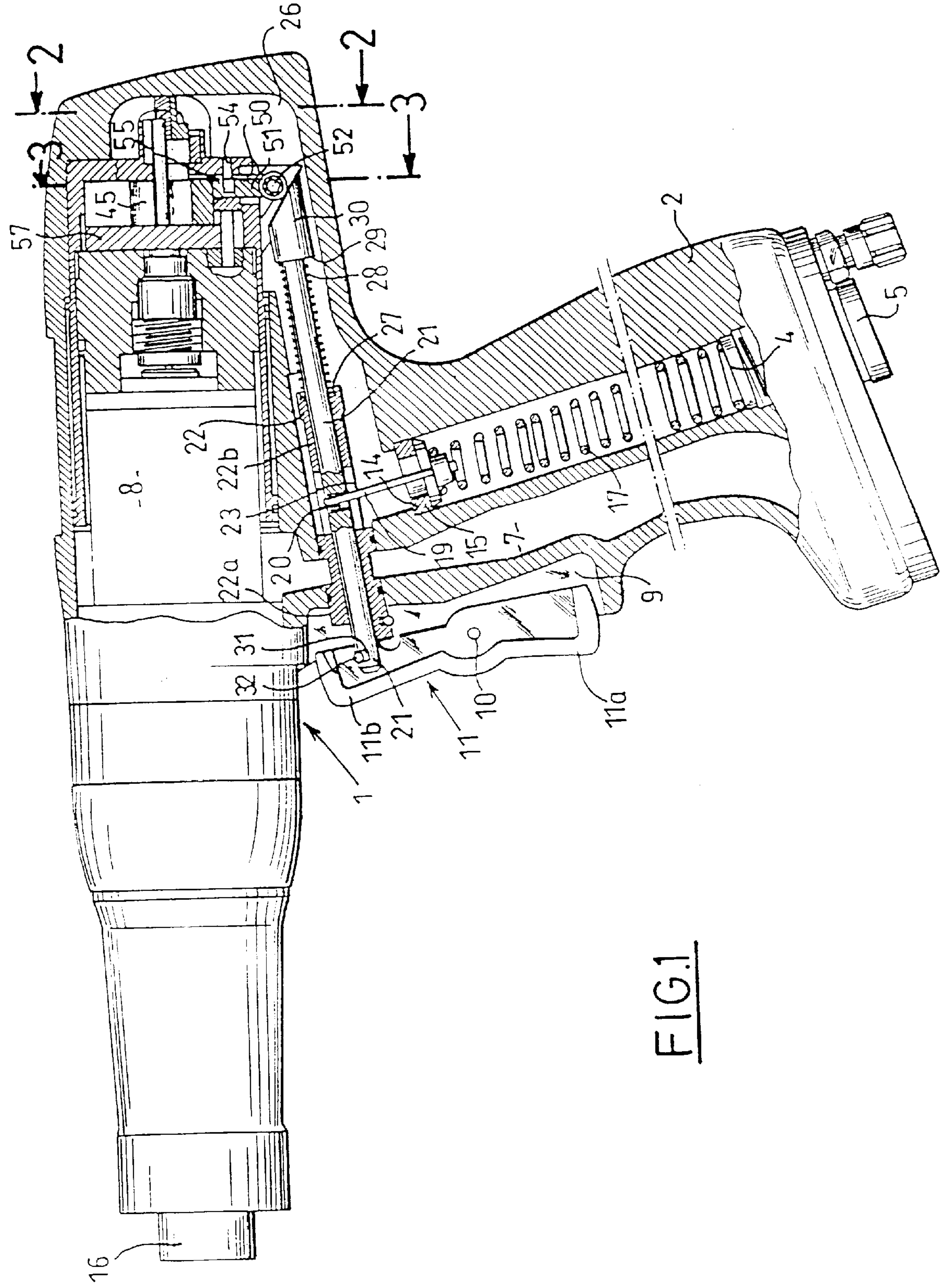
FIG. 1 is an axial sectional view of a screwdriver of the invention.

The various figures show a pneumatic screwdriver including a body 1 with a handle 2 having an inlet passage 4 adapted to be connected by a connector 5 to a pressurized fluid supply hose (not shown).

The handle 2 includes an exhaust passage 7 connected directly to the exhaust of a motor 8 driving a tool 16 via a kinematic coupling.

The handle 2 includes a housing 9 through which passes a pin 10 on which is pivoted a trigger 11 with one end 11*a* commanding rotation of the motor in one direction and another end 11*b* commanding rotation of the motor in the other direction.

The inlet passage 4 includes a seat 14 with which cooperates a valve 15 biased by a compression spring 17 inserted between the connector 5 and the valve 15, the latter being fastened to a rod 19 inserted in an opening 20 in a piston 21 mobile in a cylinder 22.

The rod 19 passes through an opening 23 in the cylinder 22 one end 22*a* of which is fixed to the handle 2, its other end 22*b* extending into a wide cavity 26 in the body 1.

The end 22*b* of the cylinder 22 terminates in an enlargement 27 in which is inserted one end of a spring 28 the other end of which bears on a shoulder 29 of a cam 30 at one end of the piston 21.

The end of the piston 21 opposite the cam 30 includes a lateral slot 31 with which cooperates a finger 32 fastened to the trigger 11. The spring 28 biases the trigger 11 into an equilibrium position in which the valve 15 is closed.

Figure 2:
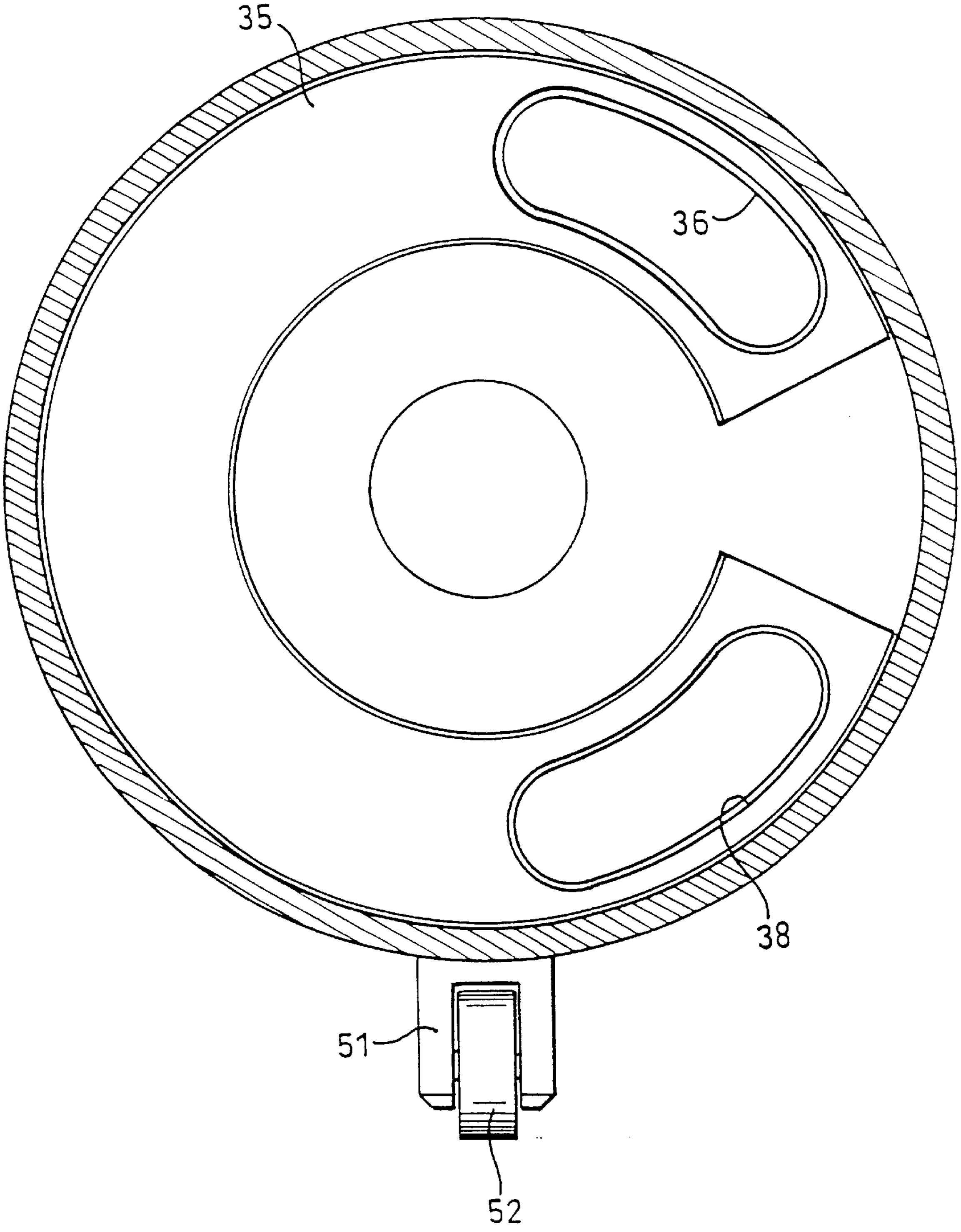
FIG. 2 is a sectional view taken along the line 2—2 in FIG. 1.

Referring to FIG. 2, the cavity 26 opens onto a rear end wall 35 facing a wall 57 and having two elongate openings 36 and 38, the opening 36 facing a compressed air inlet passage 37 such that the motor 8 is energized to rotate in a normal direction whereas the opening 38 faces a compressed air inlet passage 40 such that the motor 8 is energized to rotate in an opposite direction, the inlet passages 37 and 40 being formed in the wall 57, which also includes an exhaust passage 56.

Figure 3:
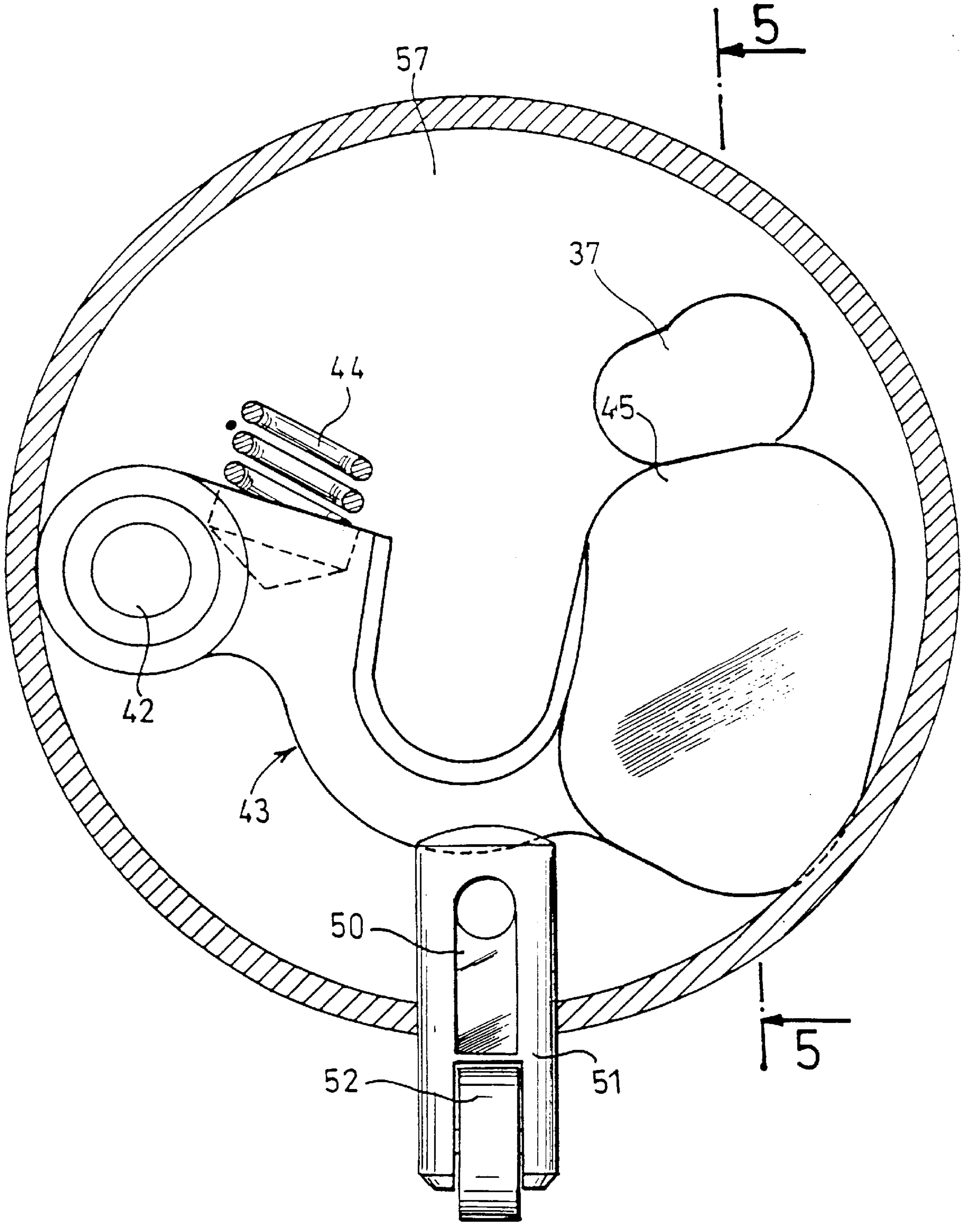
FIG. 3 is a sectional view taken along the line 3—3 in FIG. 1.
Figure 4:
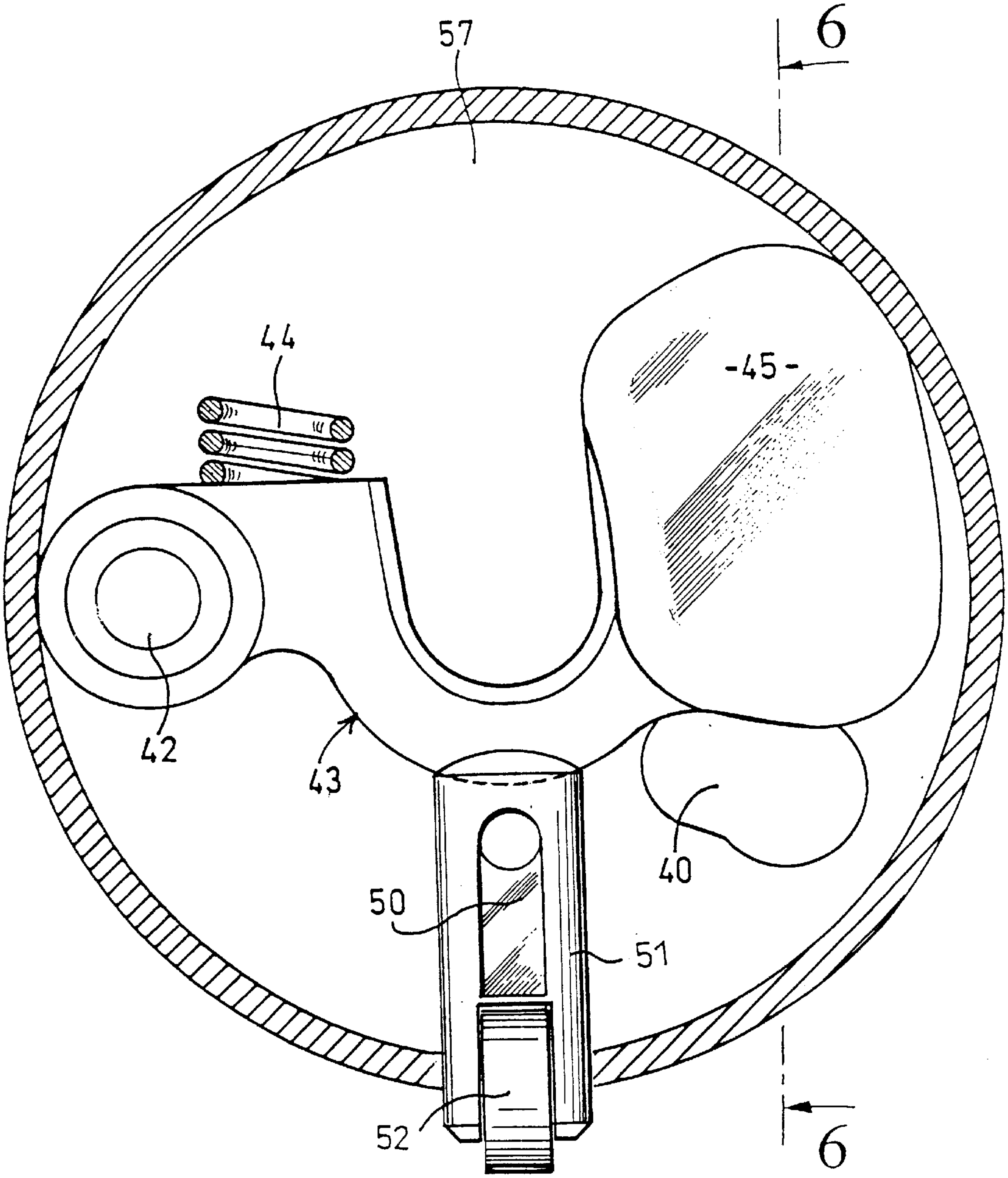
FIG. 4 is a sectional view similar to that of FIG. 3 but with the selector moved to a position commanding rotation of a motor 8 in the reverse direction.

As can be seen in FIGS. 3 and 4, a selector 43 cooperating with the wall 57 pivots on a pin 42 in front of the rear end wall and is biased by a spring 44 into a position corresponding to the normal direction of operation of the motor 8.

The free end of the selector 43 terminates at a vane 45 which is cup-shaped on the side facing toward the wall 57. The vane 45 can establish communication between the passages 40 and 56, the compressed air then entering via the passage 37. Alternatively, the vane 45 can establish communication between the passages 56 and 37, the compressed air then entering via the passage 40.

A radial bore 50 in the body 1 in line with the selector 43 contains a mobile plunger 51 including a ball bearing 52 adapted to cooperate with the cam 30.

A retaining abutment 54 cooperates with a shoulder 55 on the plunger 51 to prevent the latter escaping from the bore 50.

Figure 5:
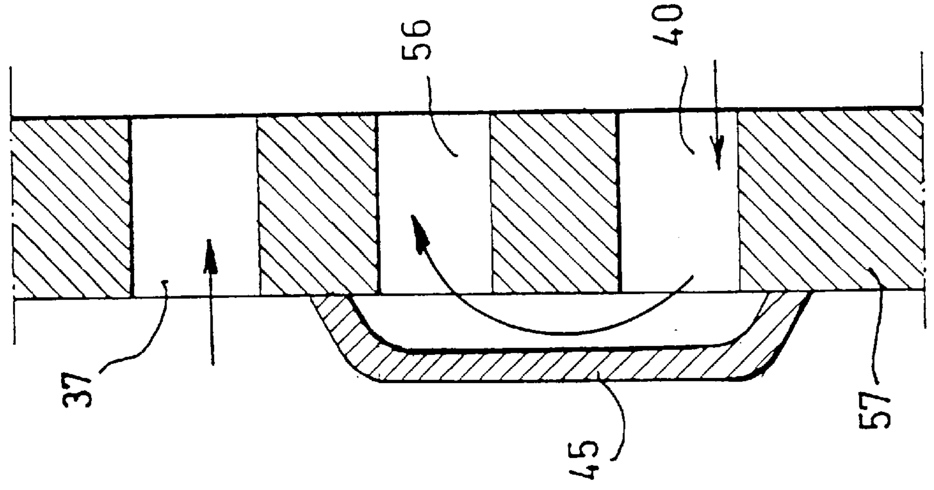
FIG. 5 is a sectional view taken along the line 5—5 in FIG. 3.

Operation is as follows: compressed air enters via the inlet passage 4; if the trigger 11 is not pressed, the valve 15 remains closed. If the operator presses on the end 11*a* of the trigger 11 the rod 19 pivots and causes the valve to be lifted off its seat 14, the compressed air flows through the cavity 26 and the opening 36 and energizes the motor via the inlet passage 37 (FIGS. 3 and 5), exhausting via the communicating passages 40 and 56.

As soon as the trigger is released the valve is closed again and the motor is no longer energized.

Figure 6:
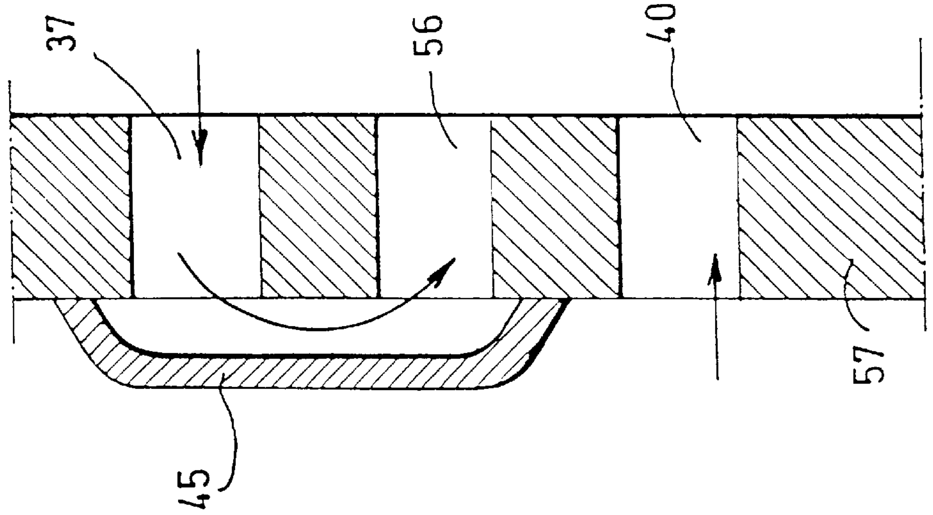
FIG. 6 is a sectional view taken along the line 6—6 in FIG. 4.

If the operator presses on the end 11*b*, the piston 21 is pushed toward the rear end of the body 1, causing the rod 19 to pivot to open the valve and causing the cam 30 to be displaced so that, cooperating with the ball bearing 52, it displaces the plunger 51 which, bearing against the selector 43, causes the latter to pivot on its pin 42 against the action of the spring 44, with the result that the vane 45 shuts off the inlet passage 37 (FIGS. 4 and 6) and opens the inlet passage 40, said inlet passage 37 communicating with the exhaust passage 56. Accordingly, the motor 8 is energized via the opening 38 and said passage 40 to turn in the direction opposite that to which it turns when the inlet passage 37 is connected to the pressurized air supply.

As soon as the trigger 11 is released, the spring 44 returns the selector 43 to its initial position and, by virtue of the ball bearing 52 cooperating with the cam 30 and the rod 19 and the spring 17, the plunger 51 returns the trigger to the neutral position.

Of course, the invention is not limited to the embodiment shown that has just been described. Many modifications of detail can be made to the latter without departing from the scope of the invention.

There is claimed:

1. A pneumatic device, comprising:

a body including a cavity opening, a bore, and a wall having an exhaust passage;

a pneumatic motor housed in the body, the pneumatic motor having an exhaust, the pneumatic motor capable of driving a tool;

a first inlet passage communicating with the cavity opening of the body, the first inlet passage corresponding to a normal direction of rotation of the pneumatic motor;

a second inlet passage communicating with the cavity opening of the body, the second inlet passage corresponding to an opposite direction of rotation of the pneumatic motor;

a handle connected to the body, the handle including a handle inlet passage capable of being connected to a compressed air supply hose, the handle including an exhaust passage connected to the exhaust of the pneumatic motor; and a control device capable of selectively conveying compressed air to the first inlet passage when a trigger is pivoted in a first direction and to the second inlet passage when the trigger is pivoted in a second direction opposite to the first direction, wherein:

the trigger is pivotally connected to the handle, the trigger is also connected to a piston which is moveable in a cylinder, the piston has an opening in which a rod is disposed, the rod is fastened to a valve such that pivoting of the trigger in the first direction is capable of causing entry of compressed air from the handle inlet passage to the cavity opening of the housing and such that pivoting of the trigger in the second direction is also capable of causing entry of compressed air from the handle inlet passage to the cavity opening of the housing, and the piston has on a side opposite of the trigger a cam cooperating with a first end of a plunger which is guided in the bore of the body, a second end of the plunger bearing against a selector, a first end of the selector pivots on a pin on the wall of the body, a second end of the selector comprises a vane which cooperates with the wall, a spring biases the selector in a position in which the first inlet passage can be supplied with compressed air and the second inlet passage communicates with the exhaust passage of the wall, pivoting of the trigger in the first direction corresponding to normal rotation of the pneumatic motor causes the piston to slide in a first sliding direction to cause opening of the valve, pivoting of the trigger in the second direction causes the piston to slide in a second sliding direction to cause opening of the valve and causes the cam to displace the plunger which moves the selector so that the vane closes the first inlet passage, opens the second inlet passage, and establishes a communication between the first inlet passage and the exhaust passage.

2. The pneumatic device of claim 1, wherein the pneumatic device comprises a screwdriver.

3. The pneumatic device of claim 1, further comprising a tool driven by the pneumatic motor via kinematic coupling.

4. The pneumatic device of claim 1, wherein the exhaust passage of the handle is directly connected to the exhaust of the pneumatic motor.

5. A pressurized fluid device, comprising:

a body including a cavity opening, a bore, and a wall having an exhaust passage;

a pressurized fluid motor housed in the body, the pressurized fluid motor having an exhaust, the pressurized fluid motor capable of driving a tool;

a first inlet passage communicating with the cavity opening of the body, the first inlet passage corresponding to a normal direction of rotation of the pressurized fluid motor;

a second inlet passage communicating with the cavity opening of the body, the second inlet passage corresponding to an opposite direction of rotation of the pressurized fluid motor;

a handle connected to the body, the handle including a handle inlet passage capable of being connected to a pressurized fluid supply hose, the handle including an exhaust passage connected to the exhaust of the pressurized fluid motor; and a control device capable of selectively conveying pressurized fluid to the first inlet passage when a trigger is pivoted in a first direction and to the second inlet passage when the trigger is pivoted in a second direction opposite to the first direction, wherein:

the trigger is pivotally connected to the handle, the trigger is also connected to a piston which is moveable in a cylinder, the piston has an opening in which a rod is disposed, the rod is fastened to a valve such that pivoting of the trigger in the first direction is capable of causing entry of pressurized fluid from the handle inlet passage to the cavity opening of the housing and such that pivoting of the trigger in the second direction is also capable of causing entry of pressurized fluid from the handle inlet passage to the cavity opening of the housing, and the piston has on a side opposite of the trigger a cam cooperating with a first end of a plunger which is guided in the bore of the body, a second end of the plunger bearing against a selector, a first end of the selector pivots on a pin on the wall of the body, a second end of the selector comprises a vane which cooperates with the wall, a spring biases the selector in a position in which the first inlet passage can be supplied with pressurized fluid and the second inlet passage communicates with the exhaust passage of the wall, pivoting of the trigger in the first direction corresponding to normal rotation of the pressurized fluid motor causes the piston to slide in a first sliding direction to cause opening of the valve, pivoting of the trigger in the second sliding direction causes the piston to slide in a second sliding direction to cause opening of the valve and causes the cam to displace the plunger which moves the selector so that the vane closes the first inlet passage, opens the second inlet passage, and establishes a communication between the first inlet passage and the exhaust passage.

6. The pressurized fluid device of claim 5, wherein the pressurized fluid device comprises a screwdriver.

7. The pressurized fluid device of claim 5, further comprising a tool driven by the pressurized fluid motor via kinematic coupling.

8. The pressurized fluid device of claim 5, wherein the exhaust passage of the handle is directly connected to the exhaust of the pressurized fluid motor.

* * * * *